United States Patent
Kuo

(10) Patent No.: US 7,259,909 B2
(45) Date of Patent: Aug. 21, 2007

(54) IMAGE-INVERTING PRISM DEVICE WITH DOUBLE USES FOR A TELESCOPE

(75) Inventor: Paul Kuo, Tainan (TW)

(73) Assignee: Sun Long Optics Co., Ltd. (TW)

( * ) Notice: Subject to any disclaimer, the term of this patent is extended or adjusted under 35 U.S.C. 154(b) by 0 days.

(21) Appl. No.: 11/081,902

(22) Filed: Mar. 15, 2005

(65) Prior Publication Data

US 2006/0056020 A1    Mar. 16, 2006

Related U.S. Application Data

(60) Provisional application No. 60/642,420, filed on Jan. 6, 2005.

(30) Foreign Application Priority Data

Sep. 16, 2004    (TW) .............................. 93214775 U

(51) Int. Cl.
    *G02B 23/00* (2006.01)
(52) U.S. Cl. ........................ 359/399; 399/422; 399/510
(58) Field of Classification Search ................. 359/399, 359/405–406, 422–431, 808–819, 510, 831
    See application file for complete search history.

(56) References Cited

U.S. PATENT DOCUMENTS

| 5,682,264 A | * | 10/1997 | Cleveland et al. .......... 359/510 |
| 5,898,519 A | * | 4/1999 | Palmer ........................ 359/399 |
| 5,959,770 A | * | 9/1999 | Perkins et al. .............. 359/422 |
| 6,020,996 A | * | 2/2000 | Perkins et al. .............. 359/399 |

* cited by examiner

*Primary Examiner*—Thong Q Nguyen
(74) *Attorney, Agent, or Firm*—Bacon & Thomas, PLLC

(57) ABSTRACT

An image-inverting prism device with double use for a telescope includes a prism contained in a housing formed of two semi-housings. The housing has a first end for connecting a lens, the first end being provided with three different diameter threaded stepped surfaces. The housing has a second end provided with a male threaded surface. The prism device further has a small lens tube, a changeover tube, a large lens tube, so when the image-inverting prism device is to be combined with a telescope with a large lens or a small lens, the changeover tube is used for connecting a large cylinder or a small cylinder of a telescope, and a large lens or a small lens respectively engaging with different diameter threaded stepped surfaces so that the image-inverting prism device may be use with both a telescope of a large lens and a small lens.

3 Claims, 5 Drawing Sheets

IMAGE-INVERTING PRISM DEVICE WITH DOUBLE USES FOR A TELESCOPE

REFERENCE TO RELATED APPLICATION

The present application claims the priority of provisional patent application Ser. No. 60/642,420 of inventor Chun-Chang Kuo (a.k.a. Paul Kuo) titled "Image-Inverting Prism With Double Uses For a Telescope" filed Jan. 6, 2005 in the United States Patent and Trademark Office.

BACKGROUND OF THE INVENTION

1. Field of the Invention

This invention relates to an image-inverting prism device with double use for a telescope, particularly to one usable for two kinds of different diameter lenses of a telescope.

2. Description of the Prior Art

In spite of a refracting or a reflective telescope, images seen through the lenses are inverted, so in order to get rid of the uncomfortable feeling in viewing through a telescope, an image-inverting prism is added between the lenses. Further, a small lens and a large lens with different focus distances are used for magnifying an object to different enlarged sizes. The small lens has a diameter 0.965 inch and the large viewing lens 1.25 inch. Makers not only manufacture the two kinds of lenses for consumers, but also have to manufacture two kinds of image-inverting prisms to correspond to the small and the large lenses. As for the image-inverting prism, it contains a prism for inverting the image, resulting in a high cost. So retailers of telescopes have to store two different kinds of small and large lenses and image-inverting prisms for consumer to select, increasing expense for the retailers and for consumers.

SUMMARY OF THE INVENTION

An image-inverting prism device in the invention has one end connecting with a lens, and the end is provided with at least three different-diameter threaded stepped surfaces, and the other end with a male threaded surface connected with a cylinder of a telescope. The prism device further has a small lens tube, a changeover tube, and a large lens tube. The small lens tube has female threads to engage the male threads of the small lens tube, the large lens tube has female threads engaging the largest diameter threaded stepped surface. When the prism device is to be combined with a telescope of a large lens, the changeover tube is inserted in the cylinder of the telescope, with the large lens inserted in the large lens tube and engaging with the second threaded stepped surface. When the prism device is to be combined with a telescope of a small lens, the changeover tube is taken off the large cylinder, and then inserted in the large lens tube and is engaged the second threaded stepped surface and then the small lens is inserted in the small cylinder of a telescope. Thus the image-inverting prism device may be used both for a large lens and a small lens telescope.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
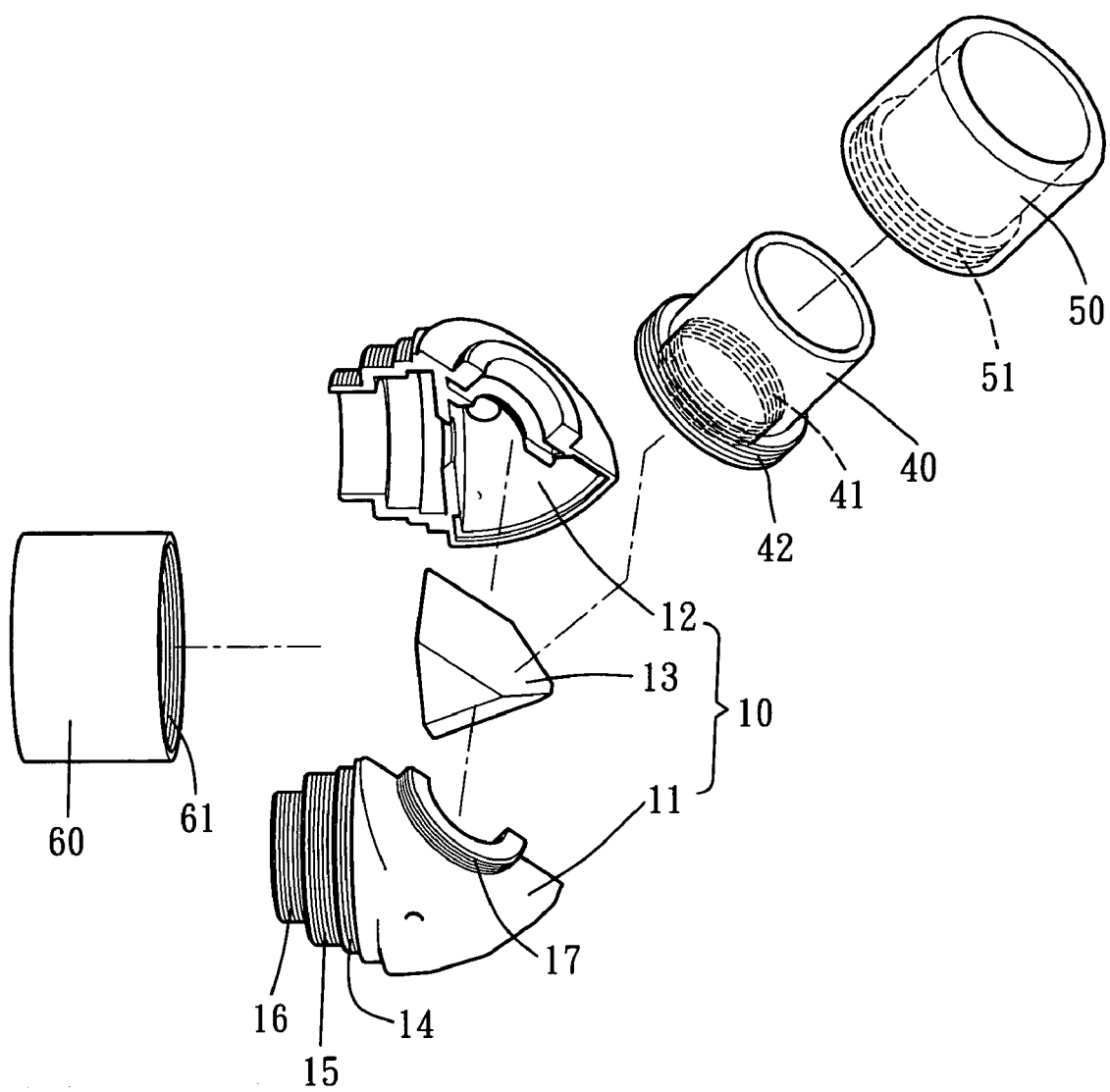
FIG. 1 is an exploded perspective view of an image-inverting prism device with double uses for telescope applied to a large viewing lens in the present invention.
Figure 2:
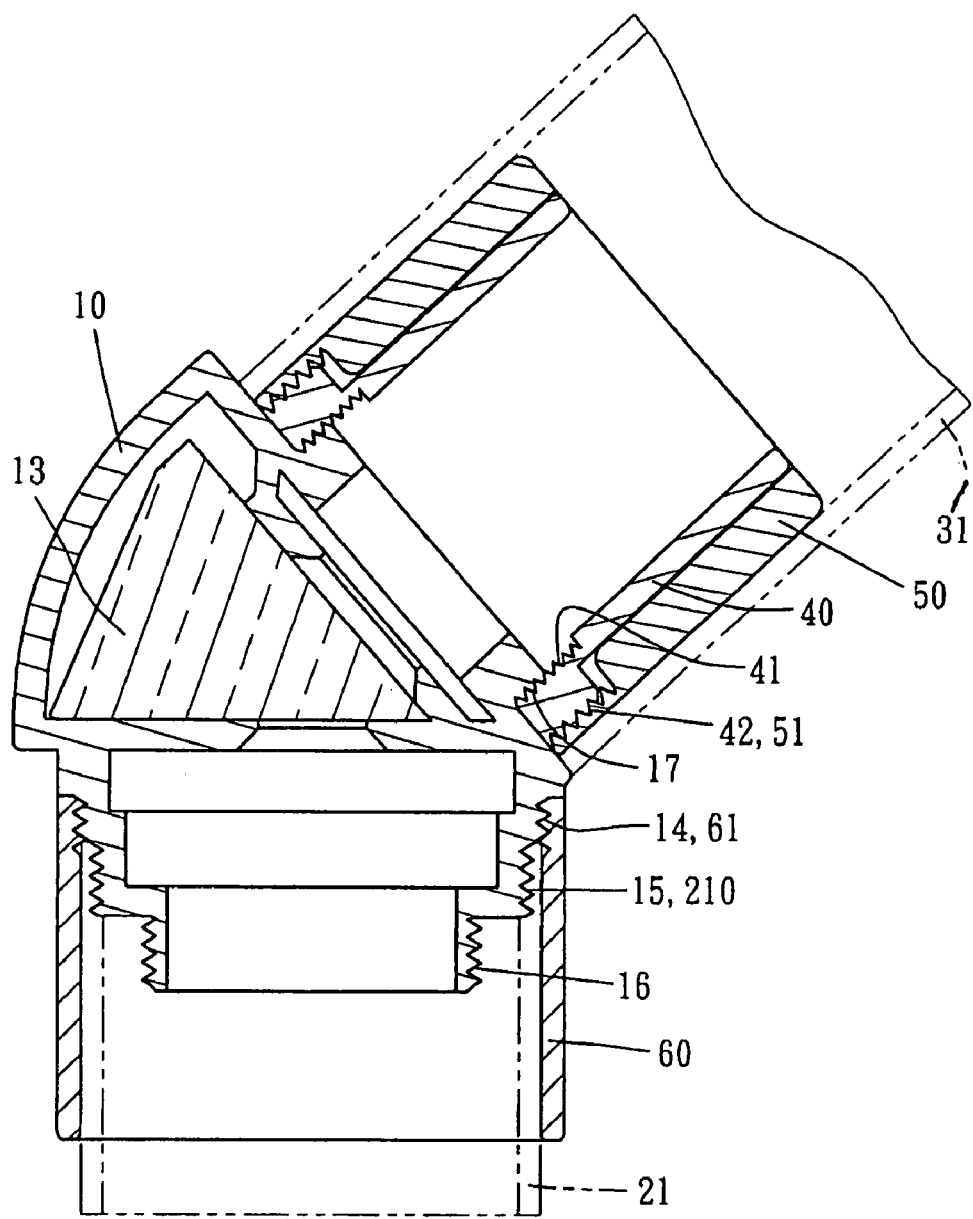
FIG. 2 is a cross-sectional view of the image-inverting prism device applied to the large lens in the present invention.

A preferred embodiment of an image-inverting prism device with double uses for a telescope in the present invention, as shown in FIGS. 1 and 2, includes an image-inverting prism 10 consisting of two semi-housings 11, 12 forming a housing, and a prism body 13, three threaded stepped surfaces formed on a first end of the housing, a first threaded stopped surface 14, a second threaded stepped surface 15 and a third threaded stepped surface 16 respectively with a different diameter. A second end of the housing is provided with a male threaded surface 17.

The prism device further has a small lens tube 40 with an outer diameter the same as that of the small telescope cylinder 32, and the small lens tube has an end provided with female threads 41 and male threads 42. The female threads 41 engage the male threaded surface 17 of the image-inverting prism device 10.

The prism device 10 further has a changeover tube 50 with an outer diameter the same as the inner diameter of the large telescope cylinder 31, and with an inner diameter the same as the outer diameter of a small lens barrel 22 supporting a small lens, fitting around the outer circumference of the small lens tube 40, having a connective end provided with female threads 51 engaging the male threads 42 of the small lens tube 40.

Further, the prism device 10 has a large lens tube 60 with an inner diameter the same as the outer diameter of the changeover tube 50, having a connective end provided with female threads 61 engaging the first threaded stepped surface 14 of the image-inverting prism device 10.

In assembling the image-inverting prism 10 with the large lens barrel 21 supporting a large lens and the large cylinder 31 of a telescope, as shown in FIG. 2, the large lens barrel 21 is inserted in the large lens tube 60, with the female threads 210 engaging the second threaded stepped surface 15 to combine with the image-inverting prism device 10. The changeover tube 50 is directly inserted in the large cylinder 31 through the connective end of the image-inverting prism 10 for the large cylinder 31. Thus the image-inverting prism 10 can be combined with the large lens 21 and the large lens cylinder 31, as shown in FIG. 2.

Figure 3:
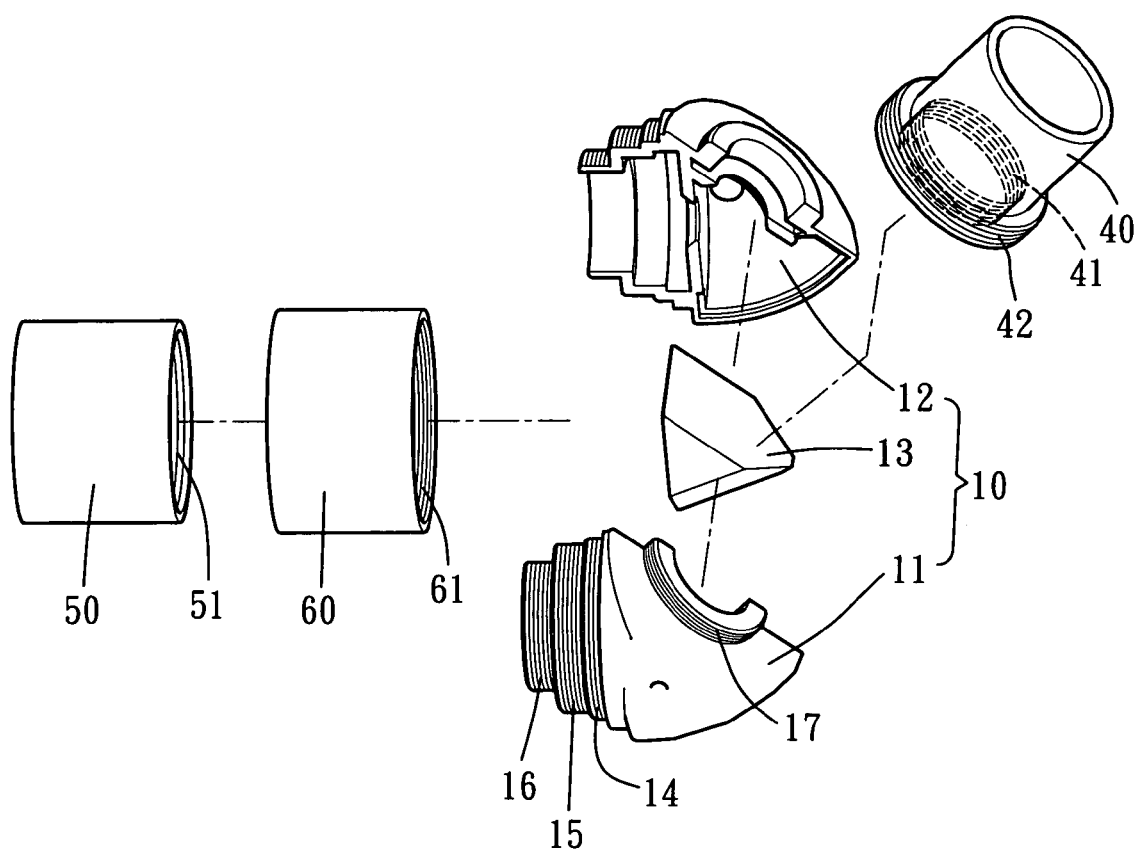
FIG. 3 is an exploded perspective view of the image-inverting prism device applied to a small lens in the present invention.
Figure 4:
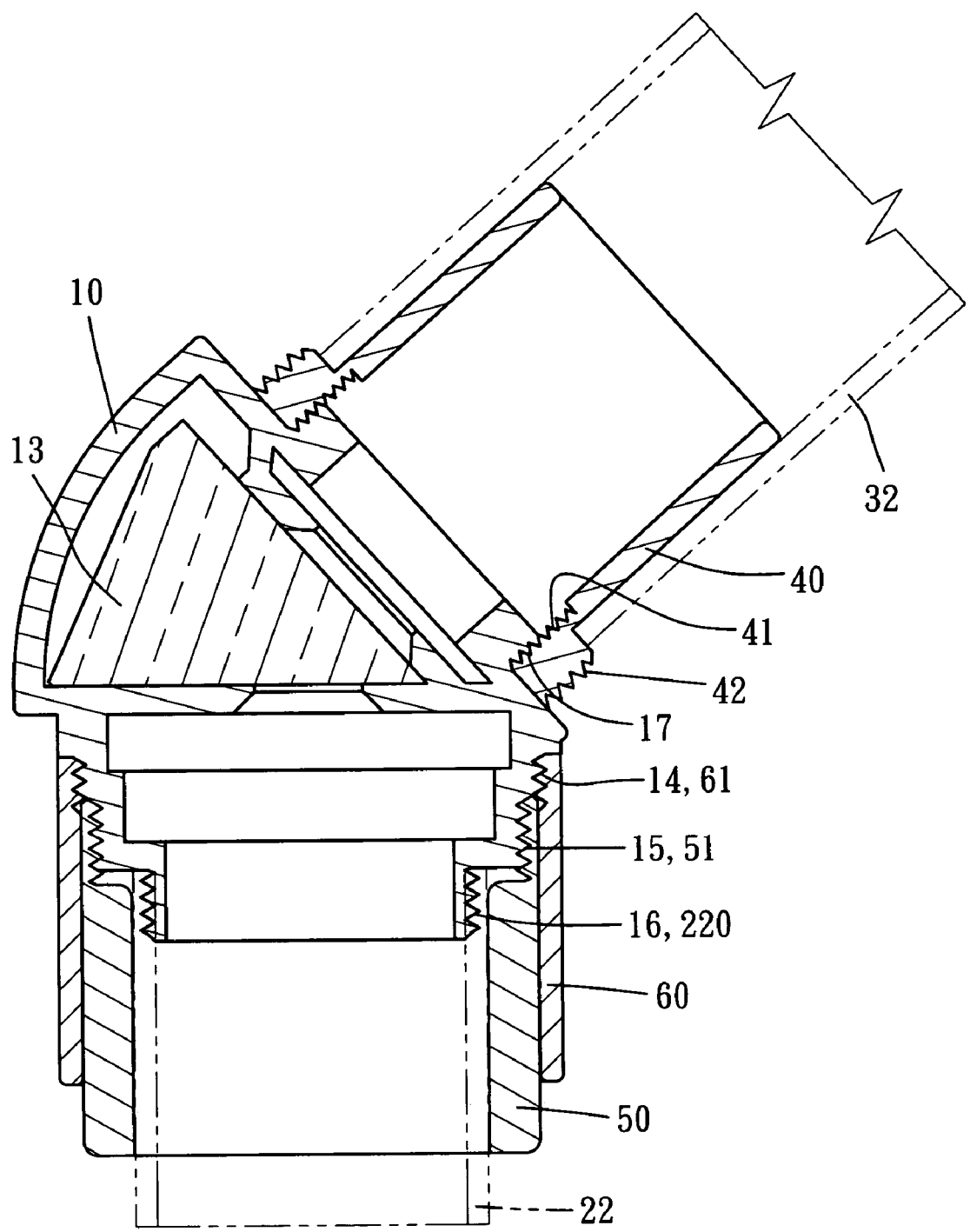
FIG. 4 is a cross-sectional view of the image-inverting prism device applied to the small lens in the present invention; and, FIG. 5 is a cross-sectional view of the image-inverting prism device having a cap respectively for two semi-housings in the present invention.

In assembling the image-reverting prism 10 with the small lens barrel 22 and the small cylinder 32, referring to FIGS. 3 and 4, the changeover tube 50 is separated from the small lens tube 40, the connective end of the changeover tube 50 is inserted in the large lens tube 60, with the female threads 51 engaging the second threaded stepped surface 15. Then the small lens barrel 22 is inserted in the changeover tube 50, with the female threads 220 of the small lens barrel 22 engaging the third threaded stepped surface 16 to combine the small lens barrel 22 with the image-inverting prism 10. The small lens tube 40 at the other end of the image-inverting prism 10 just fits in the small cylinder 32, and the image-inverting prism 10 can be combined with the small lens barrel 22 and the small cylinder 32.

Figure 5:
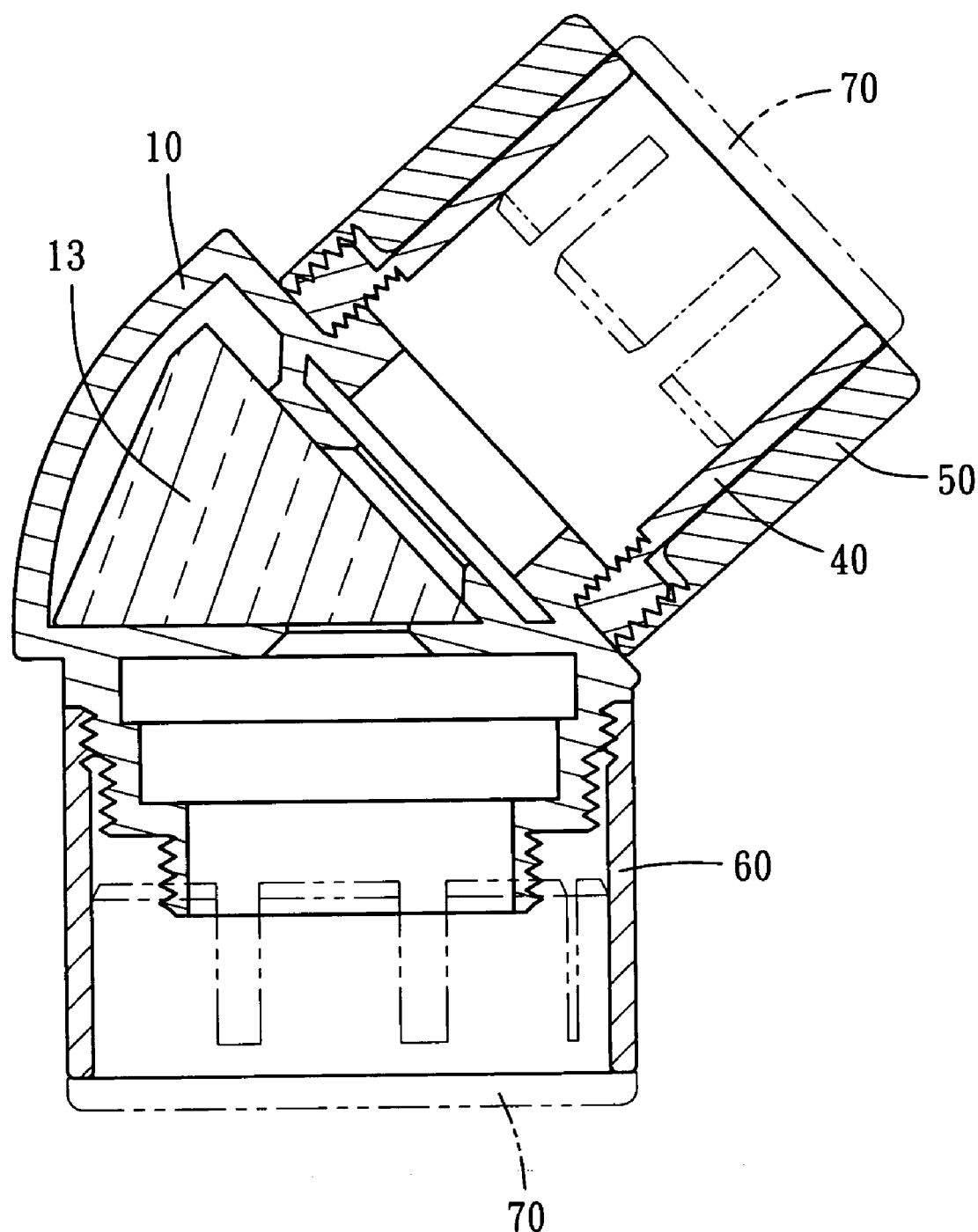

Next, when the image-inverting prism 10 is not yet combined with the lens and the telescope cylinder, caps 70 may be used to cover the ends of the large and the small lens tube 60 and 40 as shown in FIG. 5, in order to prevent dirt or the like from entering into the image-inverting prism 10 through the large and the small lens tubes 60 and 40.

In general, the image-inverting prism device 10 can surely be combined both with the large and the small lens barrels 21 and 22 and inserted in the large and the small cylinder 31 and 32, improving the conventional two kinds of image-inverting prisms, saving expenses for molds and reducing the number of stock for retailers.

While the preferred embodiment of the invention has been described above, it will be recognized and understood that various modifications may be made therein and the appended claims are intended to cover all such modifications that may fall within the spirit and scope of the invention.

What is claimed is:

1. An image-inverting prism device with double uses for a telescope comprising a prism and two semi-housings forming a housing containing said prism, said housing having a first end for connecting a lens and provided with at least three threaded stepped surfaces of different diameters, said three threaded stepped surfaces consisting of a first threaded stepped surface, a second threaded stepped surface and a third threaded stepped surface, said housing having a second end provided with a male threaded surface for connecting a telescope cylinder; said prism device further including a small lens tube, said small lens tube having an end provided with female threads and male threads, said female threads engaging the male threaded surface of said image-inverting prism device; said prism device further having a changeover tube fitting around said small lens tube, said changeover tube having one end provided with female threads engaging the male threads of said small lens tube; said prism device further having a large lens tube, said large lens tube having an end provided with female threads engaging said first threaded stepped surface;

wherein said large lens tube is configured to receive a large lens barrel to combine with said second threaded stepped surface, said changeover tube is configured to be inserted and combined with a large cylinder of a telescope so that said image-inverting prism device can be combined with said large lens barrel and said large cylinder of a telescope; said changeover tube configured to receive a small lens barrel inserted in said changeover tube and engaged with said third threaded stepped surface after said changeover tube is engaged with said second threaded stepped surface in said large lens tube, said small lens tube is configured to be inserted in a small cylinder of a telescope so that said image-inverting prism device is combinable with said small lens barrel and said small cylinder.

2. The image-inverting prism device with double uses for a telescope as claimed in claim 1, wherein said large and said small lens tubes each have a cap fitting around their mouths for preventing dirt from entering.

3. The image-inverting prism device for a telescope as claimed in claim 1, wherein said small lens tube has an outer diameter the same as the inner diameter of said small cylinder; said changeover tube has its outer diameter the same as the inner diameter of said large cylinder, and the inner diameter of said changeover tube is the same as the outer diameter of said small lens barrel; said large lens tube has its inner diameter the same as the outer diameter of said changeover tube.

\* \* \* \* \*